Dec. 2, 1930. P. W. MORGAN 1,783,444
FILTER FOR CLEANING FLUIDS
Filed Aug. 9, 1929
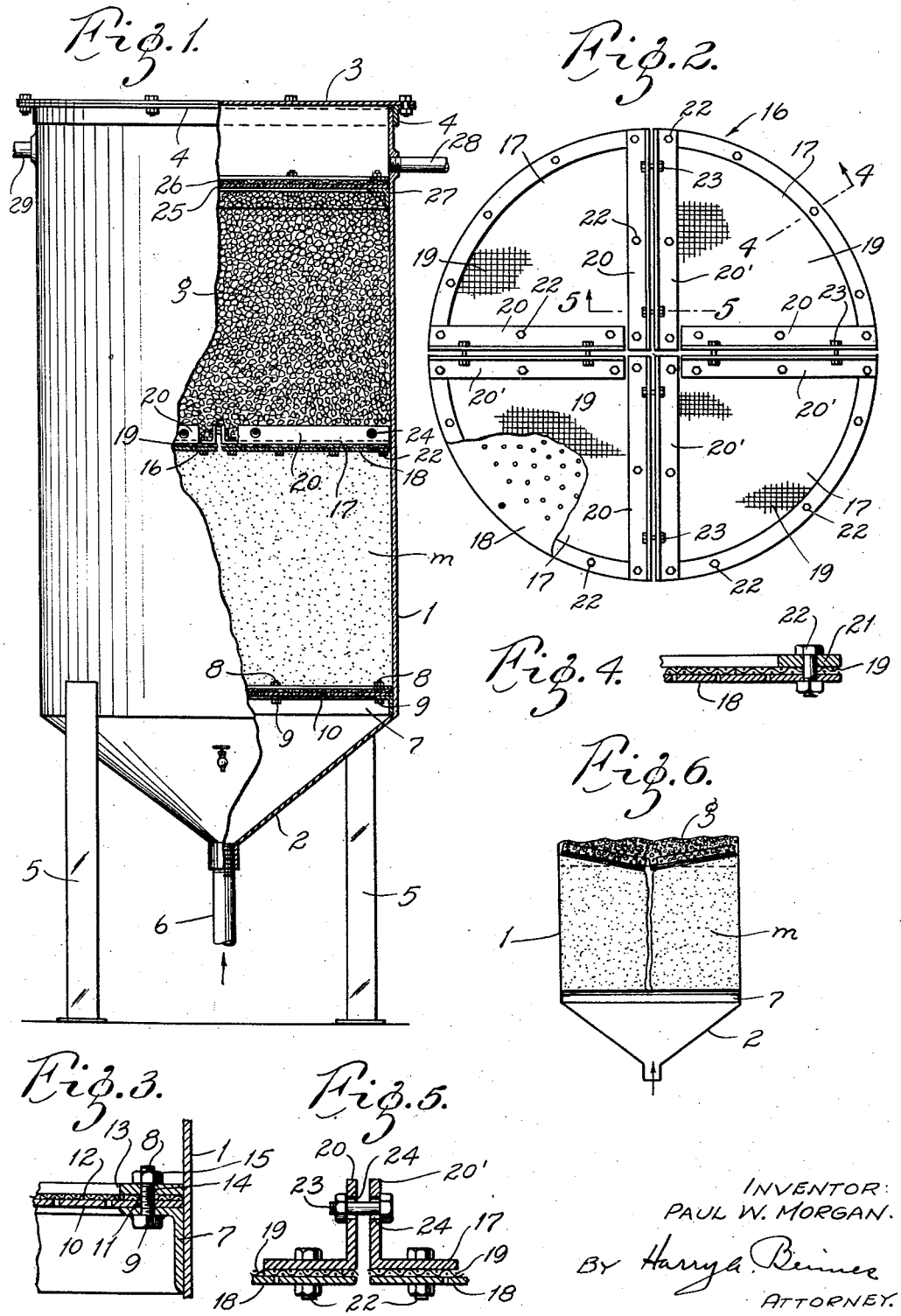
INVENTOR:
PAUL W. MORGAN.
By Harry A. Benner
ATTORNEY.

Patented Dec. 2, 1930

1,783,444

UNITED STATES PATENT OFFICE

PAUL W. MORGAN, OF ST. LOUIS, MISSOURI, ASSIGNOR TO MORGAN DRY CLEANERS EQUIPMENT CO., OF ST. LOUIS, MISSOURI, A CORPORATION OF MISSOURI

FILTER FOR CLEANING FLUIDS

Application filed August 9, 1929. Serial No. 384,771.

My invention has relation to improvements in filters and it consists in the novel features of construction more fully set forth in the specification and pointed out in the claim.

Briefly the invention comprises a tank in which is a bed of a suitable filter medium through which the liquor to be filtered is passed upwardly, said filter bed being weighted down by a bed of inert material. A flexible screen is disposed between the filter bed and the inert bed to allow for readjustment of the particles of the filter bed when displaced by the pressure of the up-flowing liquor.

The object of my invention is to provide a filter having a filter medium that may be scrubbed without removing it and without impairing its filtering properties; and one having means for maintaining the bed in compact condition. Further advantages will be better apparent from a detailed description of the invention in connection with the accompanying drawings, in which—

Figure 1 is a combined side elevation and vertical longitudinal section through the filter; Fig. 2 is a plan of the flexible screen separating the filter medium from the pressure bed with parts broken away; Fig. 3 is an enlarged sectional detail of the supporting screen for the filter bed; Figs. 4 and 5 are sectional details on the lines 4—4 and 5—5 of Fig. 2, respectively; Fig. 6 is an outline view showing how the flexible screen may conform to changes in the contour of the filter bed due to channeling.

Referring to the drawings 1 represents a filter tank having a conical hopper bottom 2 and a lid 3 adapted to be bolted to a top annular flange 4. The tank 1 is supported by legs 5, 5 and an inlet pipe 6 is adapted to be threaded, or otherwise secured, into the bottom of hopper 2. An annular angle iron flange 7 is welded (or otherwise secured) to the inside of the wall of tank 1 immediately above the hopper 2; and a plurality of bolts 8 traverse the horizontal leg of the angle 7 and have their heads 9 welded thereto. A perforated plate 10 is disposed on angle flange 7 said plate having marginal holes 11 through which bolts 8 pass, and a wire screen 12 rests on plate 10, said screen having a marginal ring 13 soldered to it in which are holes 14 for receiving bolts 8. Plate 10 and screen 12 together constitute the support for a bed of fiter material m and are held securely in place by nuts 15 on the bolts 8.

The filter bed m is preferably composed of charcoal (a commercial form called clearonite being satisfactory) crushed to pass about a 100 mesh screen and the bed varies in depth according to the conditions involved. A flexible perforate partition 16 comprising, in the present instance, four sectional members 17, 17 etc. each consisting of a perforate plate 18 in the shape of a quadrant, and a similarly shaped wire screen 19 having angles 20, 20' along its radial margins and a marginal band 21, are, preferably, soldered to the screen. Screen and plate sections are bolted together by bolts 22 through both the angles and band. The four quadrant members 17 are secured together (as shown in Figures 2 and 5) by bolts 23, 23 passed loosely through openings 24, 24 in the angles 19 and 19', said openings being considerably larger than the bolts to permit movement between adjacent sections 17. It is the loose coupling of the sections that imparts flexibility to the screen partition 16.

A bed of gravel g is disposed on the partition 16 and serves as a weight to hold the filter bed m compact, and a screen formed of a perforate plate 25 and wire screen 26 suitably secured together is positioned upon an angle flange 27 a short distance below the top of the tank 1, and above the screen 25, 26 are an outlet pipe 28 and an overflow pipe 29 opposite thereto.

It will be understood that when a liquor, such as dirty naphtha that has been used for cleaning clothes, is introduced into the filter under pressure through pipe 6, there is a tendency for the stream to cut channels in the filter bed m, as shown in Fig. 6, and the function of the gravel bed is to break down said channels as rapidly as they form. The screen 16 is required to separate the gravel from the filter material, but if this screen is rigid it will naturally form an arch over the filter bed and permit the formation of channels therein. However, providing the screen partition 16 with flexibility allows it to settle down into the filter bed and break down any channels that may form.

An advantage in using charcoal as a filter medium is that it is unaffected by most liquids and at the same time readily yields the dirt and other impurities collected on being back-washed, that is, having the liquid run through it in the reverse direction. It may also be scrubbed by having steam forced through it.

Having described my invention, I claim:

A filter comprising a tank having an inlet at one end and an outlet at the opposite end, a bed of filter material in said tank, a pervious support therefor, a mass of inert material over said filter bed, and a partition screen between the filter bed and inert material, said partition screen comprising a plurality of sections in loosely connected relation.

In testimony whereof I hereunto affix my signature.

PAUL W. MORGAN.